(12) United States Patent
Pedziwiatr

(10) Patent No.: US 8,646,267 B1
(45) Date of Patent: Feb. 11, 2014

(54) BUOYANT FORCE POWER GENERATION

(76) Inventor: Edward A. Pedziwiatr, Jensen Beach, FL (US)

( * ) Notice: Subject to any disclaimer, the term of this patent is extended or adjusted under 35 U.S.C. 154(b) by 140 days.

(21) Appl. No.: 13/410,585

(22) Filed: Mar. 2, 2012

Related U.S. Application Data

(60) Provisional application No. 61/448,757, filed on Mar. 3, 2011.

(51) Int. Cl.
  *F03B 17/02* (2006.01)
  *F01D 25/28* (2006.01)
  *F03D 5/02* (2006.01)
  *F01D 23/00* (2006.01)
  *F03B 9/00* (2006.01)
  *F04B 19/16* (2006.01)

(52) U.S. Cl.
  USPC .................... 60/496; 60/495; 415/5; 415/7

(58) Field of Classification Search
  USPC .............. 60/495–496; 415/5, 7, 1, 916; 137/1
  See application file for complete search history.

(56) References Cited

U.S. PATENT DOCUMENTS

| | | | |
|---|---|---|---|
| 3,360,926 A * | 1/1968 | Parr | 60/496 |
| 3,412,482 A * | 11/1968 | Kusmer | 434/300 |
| 3,934,964 A | 1/1976 | Diamond | |
| 4,363,212 A | 12/1982 | Everett | |
| 4,407,130 A | 10/1983 | Jackson | |
| 4,498,294 A | 2/1985 | Everett | |
| 5,372,474 A * | 12/1994 | Miller | 415/1 |
| 5,944,480 A | 8/1999 | Forrest | |
| 5,996,344 A | 12/1999 | Frenette et al. | |
| 6,115,950 A | 9/2000 | Al-Mutairi | |

* cited by examiner

*Primary Examiner* — Kenneth Bomberg
*Assistant Examiner* — Deming Wan
(74) *Attorney, Agent, or Firm* — Arthur Jacob

(57) ABSTRACT

An underwater air or gas powered apparatus utilizes the buoyant force of water to generate power in the form of work or electricity. Air bags are spaced circumferentially around the perimeter of a rotary member immersed in water and are alternately inflated and deflated in a sequence enabling buoyant forces to rotate the rotary member. A generator is coupled to the rotary member for generating power in response to rotation of the rotary member.

19 Claims, 3 Drawing Sheets

BUOYANT FORCE POWER GENERATION

CROSS-REFERENCE TO RELATED APPLICATIONS

This application claims the benefit of Provisional Patent Application Ser. No. 61/448,747, filed Mar. 3, 2010, the disclosure of which is incorporated herein in its entirety by reference thereto.

FIELD OF THE INVENTION

This invention relates to an underwater air powered apparatus utilizing the buoyant force of water for generating power in the form of work or electricity.

BACKGROUND OF THE INVENTION

Various methods and devices have been utilized to generate power in the form of electricity or mechanical work by rotating a wheel and/or an axle. The windmill is one such device which collects air in the form of wind in its paddles, rotating one or more structural elements to produce work or store the work as electricity in a storage battery. Similarly, a waterwheel, positioned near a running water source, collects water in its paddles, rotating one or more structural elements to produce work or electricity. Both apparatus and methods take advantage of natural, renewable energy sources and depend upon placement dictated by natural resources. In the case of windmills, large open areas of land in wind-dominant climates are required. The windmills render the land upon which they are situated, and surrounding land, unsuitable for development. Water wheels are similarly hampered by the dictates of their power source.

SUMMARY OF THE INVENTION

The present invention strives to overcome the inherent problems with windmills and related apparatus by utilizing buoyancy to rotate a wheel assembly in a limited environment, such as underwater. Tests show that a gallon container of air contains sufficient buoyancy to lift approximately seven and one half pounds in water. By utilizing the buoyancy of air in water to move and thereby rotate a wheel assembly, natural and unlimited renewable resources may be directed to energy production. Furthermore, the apparatus does not rely upon running water for power, overcoming the shortcomings of certain prior art water-powered power generating devices.

Advantages of the invention over the prior art include the ability to size the generator for multiple and suitable tasks, low cost construction, simple operation and easy maintenance. The device conserves land resources and opens up a wider range of water-based resources to generate work and power. In one form, the invention comprises two wheels situated in tandem, with a connecting axle, establishing the wheel assembly.

Between the wheels of the assembly are platforms. Through these platforms are protruding hollow air-tight tubes at a proximal and distal point on the wheel assembly. These tube-ends are connected to air chambers in the form of gas bags or air bags. Flaps are hinged onto the wheel assembly over the platforms and biased by a spring into an open position. Air bags or air chambers are fastened under the flaps holding a quantity of compressed air. Wheels with ball-bearings are included to reduce friction during a depression phase while air is transferred from one air bag or air chamber into a counterpart air bag or air chamber located at an opposite side of the wheel assembly. These ball-bearing wheels are located on an upper part of the flaps.

A flap-depressing surface is situated adjacent a portion of the outside edge of the wheel assembly, such that as the wheel assembly rotates, the flap-depressing surface depresses the spring-biased flaps toward a closed position. This manner of flap-mounting or positioning allows the air bags or air chambers to press against the underside of the flaps to set and keep the wheel assembly in motion.

Operation of the invention is initiated by introduction of an appropriate quantity of compressed air into the tube assembly through a series of valves. This value or quantity of supplied air is sufficient to extend a distal air chamber or air bag upon compression of a proximal air chamber or air bag. Alternatively, gas deposits located below the ocean floor or other appropriate geographic location may serve as a supply for expanding an air chamber or air bag of the assembly. The compressed air is directed to, and expands the air chamber or air bag fitted over a proximal tube end, thereby extending a respective flap. Air contained within a series of such expanded air chambers or air bags provides buoyancy within the water, thereby rotating the wheel assembly. As each flap approaches the top of the rotating assembly, the flap-depressing surface contacts the ball-bearing wheels, thus depressing the flaps. As a flap is depressed, air is expelled from the corresponding air chamber or air bag into the proximal tube end and through its respective tube, to the distal tube end and into a second air chamber or air bag at the bottom of the rotating assembly, thereby extending its flap and providing buoyancy to enable continued rotation of the wheel assembly. The springs connected to the flaps assist in moving the flaps during the opening procedure.

As the wheel assembly rotates, it generates work which may be transferred to an axle, a power generating device or into storage for later use.

DESCRIPTION OF THE INVENTION

Figure 1:
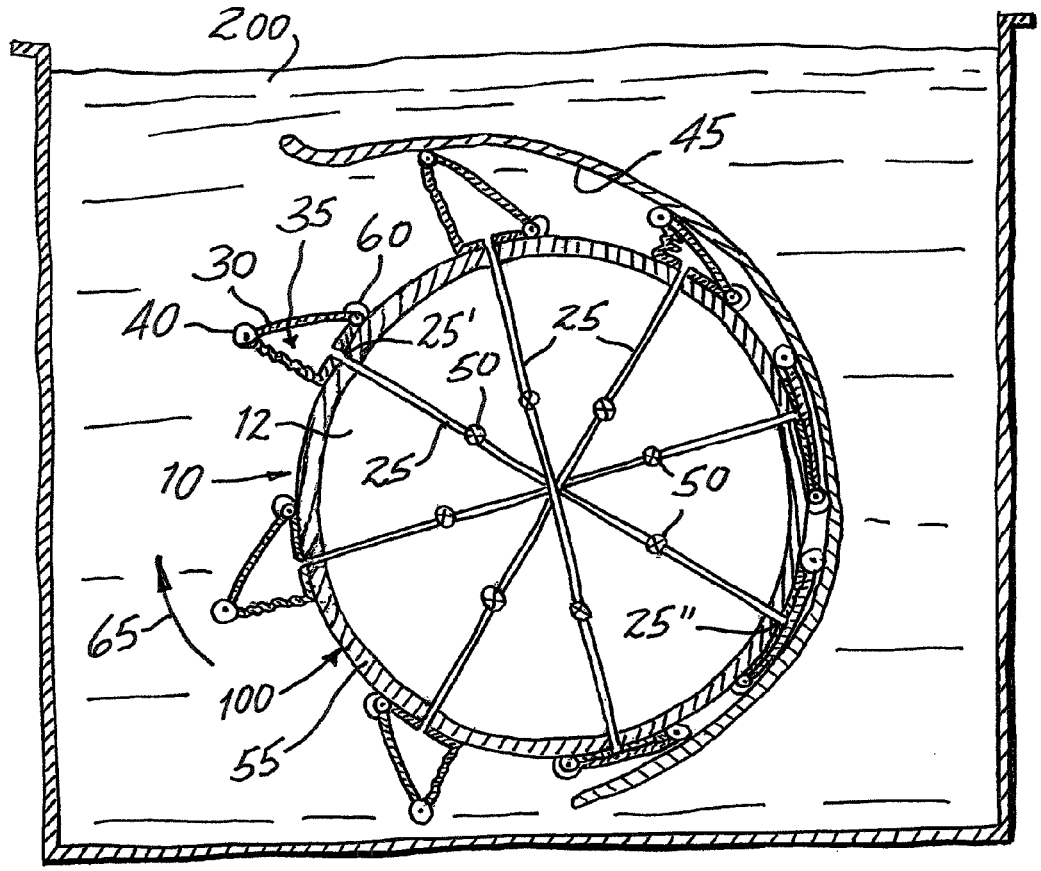
FIG. 1 is a partially diagrammatic, elevational cross-sectional view of an apparatus constructed and shown operating in accordance with the present invention.
Figure 2:
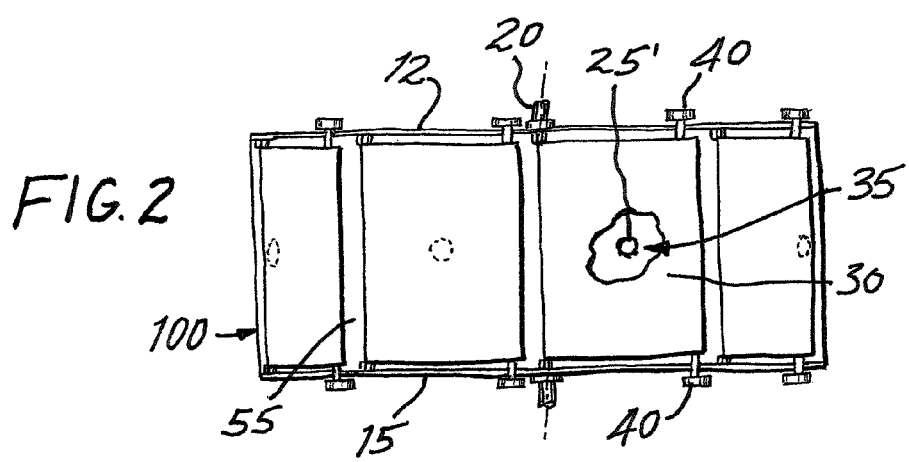
FIG. 2 is a top view of component parts of the apparatus of FIG. 1.

Shown in FIGS. 1 and 2 is a side view of an apparatus 10 constructed in accordance with the present invention. A first wheel 12 and a second wheel 15 are situated in tandem, with a connecting axle 20 and a platform 55 placed between the wheels 12 and 15, comprising a wheel assembly 100. Situated between the wheels are hollow air-tight tubes 25 mounted in the platform 55 which is located between the wheels 12 and 15 of the assembly 100, each tube 25 lying intermediate the wheels 12 and 15 of the wheel assembly 100 and having a proximal exit point 25' and distal exit point 25" on the wheel assembly 100. At each exit point 25' is mounted a hinged flap 30 of an air chamber or air bag 35 suitable for holding a quantity of gas, here in the form of compressed air. At the outer edge of each flap 30 is mounted a friction-reducing means in the form of ball-bearing flap wheels 40, and a spring 60 biases the flap 30 radially outwardly.

A flap-depressing surface 45 is situated adjacent to and extending along a portion of the outside edge of the wheel assembly 100 such that, as the wheel assembly 100 rotates, the flap-depressing surface 45 engages the ball-bearing flap wheels 40 and depresses the spring-biased flaps 30. Thus, the flap-depressing surface 45 and the ball-bearing flap wheels 40 comprise a drive assembly in which each ball-bearing flap wheel 40 serves as a driver for collapsing each air bag 35.

The apparatus is at least partially submerged in water 200.

Operation of the invention is initiated by the introduction of a quantity of compressed air into the tube assemblies through a series of valves 50. The compressed air is directed to, and expands the air bag 35 fitted over its respective tube end 25' or 25", thereby extending its respective flap 30. Air contained within a series of expanded air bags 35 provides buoyancy within the water 200, thereby rotating the wheel assembly 100 in the clockwise direction indicated by arrow 65. As each flap 30 approaches the top position of the rotation cycle, contact between the flap wheels 40 and the flap-depressing surface 45 depresses the flap 30. As the flap 30 is depressed, air is expelled from the corresponding air bag 35, into the proximal tube end 25' and through its respective tube 25, to the distal tube end 25" and into a second air bag 35 at a position at the bottom of the rotation cycle, thereby extending its flap 30 and providing buoyancy to enable continued rotation of the wheel assembly 100.

FIG. 2 is a top view of the apparatus 10. Shown are the first wheel 12 and the second wheel 15 situated in tandem, with the connecting axle 20 and the intermediate platform 55, comprising the wheel assembly 100. Situated between the wheels 12 and 15 are the hollow air-tight tubes 25, each tube 25 lying intermediate the wheels 12 and 15 of the wheel assembly 100 and having a proximal exit point 25' and an opposite distal exit point 25" on the wheel assembly 100, as seen in FIG. 1. Each of the spring-biased hinged flaps 30 is placed over an air chamber or air bag 35 suitable for holding a quantity of compressed air. At the outer edge of each flap 30 are mounted the ball-bearing flap wheels 40.

Figure 3:
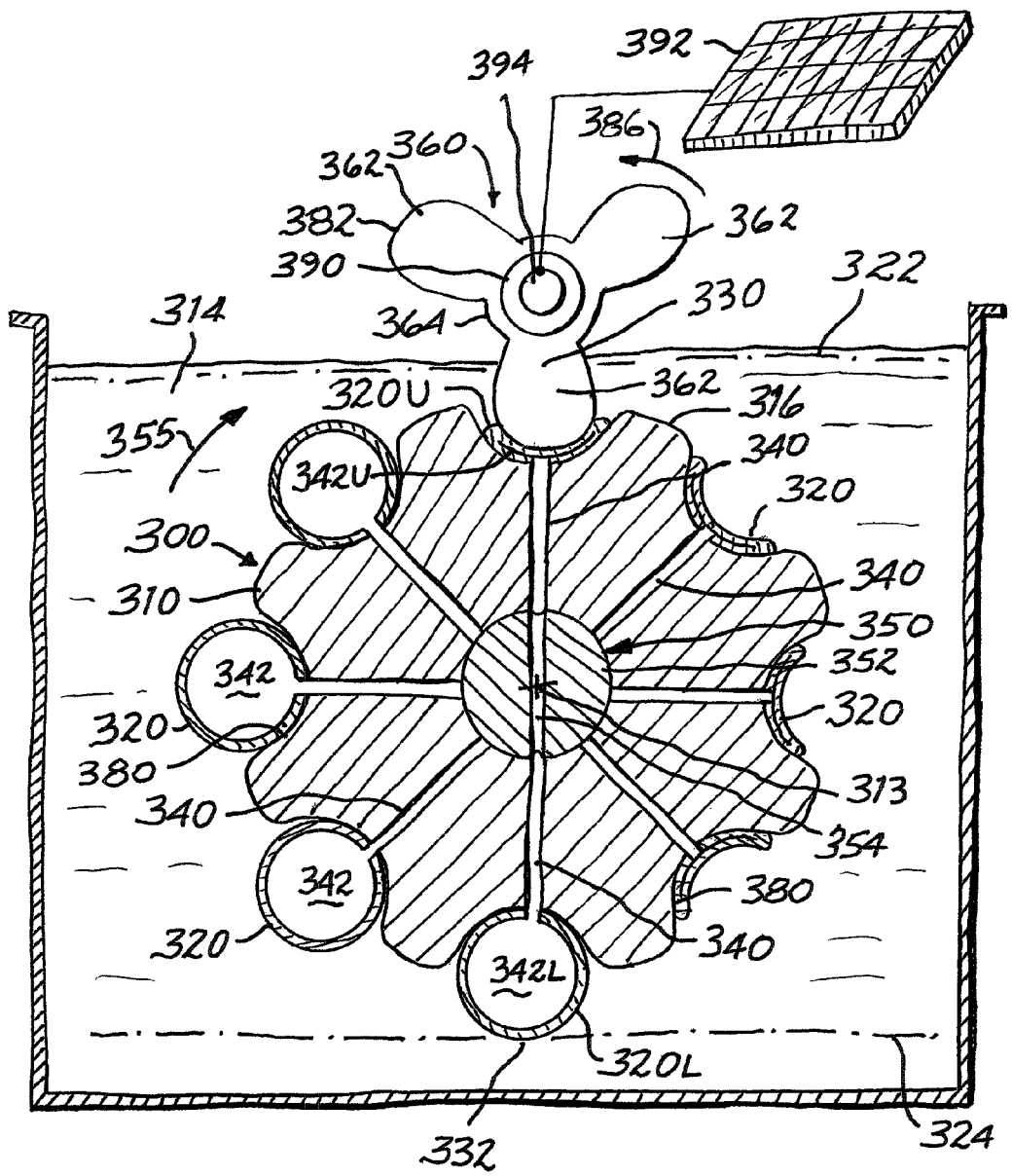
FIG. 3 is a partially diagrammatic, elevational cross-sectional view of another apparatus constructed and shown operating in accordance with the present invention.
Figure 4:
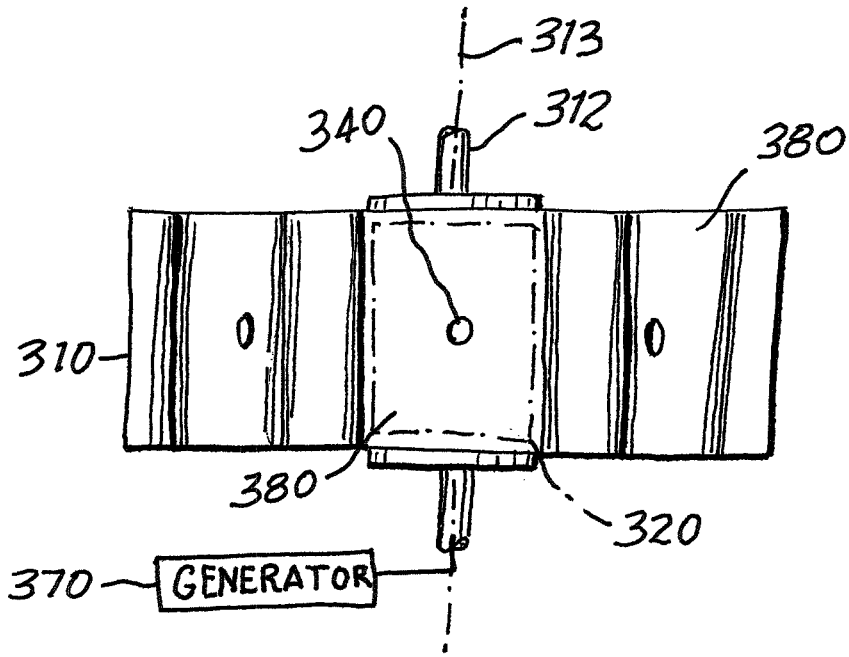
FIG. 4 is a top plan view of a component part of the apparatus of FIG. 3.
Figure 5:
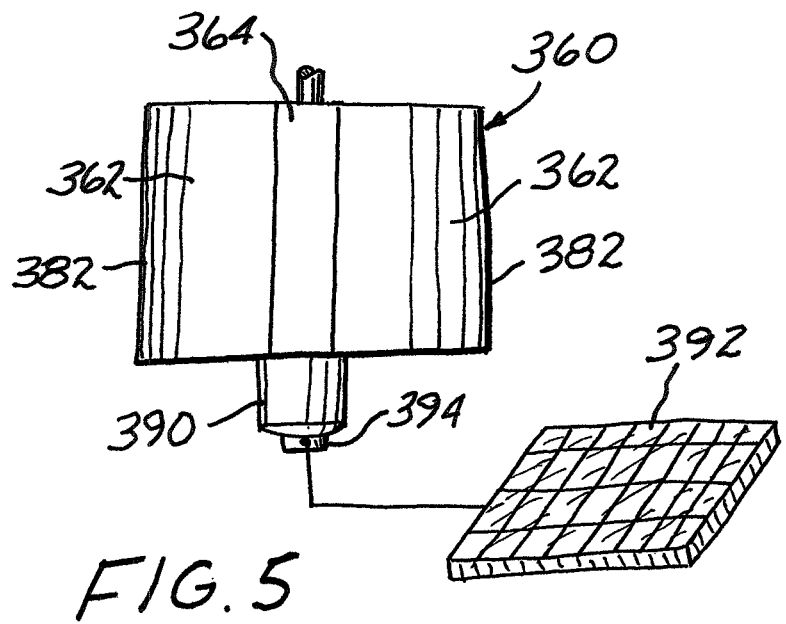
FIG. 5 is a partially diagrammatic top plan view of further component parts of the apparatus of FIG. 3.

Turning now to FIGS. 3 through 5, another apparatus constructed and operating in accordance with the present invention is shown at 300 and is seen to include a rotary member 310 mounted on an axle 312 for rotation about a axis of rotation 313, while immersed in a liquid, preferably in the form of water 314. Rotary member 310 has a perimeter 316 spaced radially from the axle 312, and from the axis of rotation 313.

A plurality of chambers are shown in the form of collapsible gas bags and are illustrated as air bags 320 spaced circumferentially from one-another along the perimeter 316 of the rotary member 310. Axle 312 is oriented in a substantially horizontal orientation so that rotation of the rotary member 310 about the axle 312 moves the air bags 320 between an uppermost elevation 322 and a lowermost elevation 324. Each air bag 320 is located relative to a counterpart air bag 320 such that upon an air bag 320 reaching an upper location 330, adjacent to and preferably at the uppermost elevation 322, as illustrated by the position of air bag 320U, the counterpart air bag 320 is placed at a lower location 332, adjacent to and preferably at the lowermost elevation 324, as illustrated by the position of air bag 320L. In the preferred construction, each air bag 320 is located diametrically opposite a corresponding counterpart air bag 320, as illustrated in FIG. 3 wherein every air bag 320 has an opposite counterpart air bag 320 spaced circumferentially away by 180°.

A plurality of gas passages, shown in the form of air passages 340, extend through rotary member 310 and interconnect the interior 342 of each air bag 320 with the interior 342 of a corresponding counterpart air bag 320, thereby providing communication between the interiors 342 of the opposite air bags 320. As seen in FIG. 3, a valving system 350 includes a centrally located hub 352 having a diametric, vertically oriented conduit 354. Hub 352 is maintained stationary while axle 312 rotates with the rotation of rotary member 310, about axis of rotation 313, in the clockwise direction indicated by arrow 355. Each diametric passage 340 is interrupted by hub 352 such that only the air passage 340 that is registered with conduit 354 provides open communication between the interiors 342 of the air bags 320 connected by the registered air passage 340. In this manner, only the interior 342 of air bag 320U, placed at the upper location 330, is in communication with the interior 342 of the air bag 320L, placed at the lower location 332, while communication between the respective interiors 342 of all of the other air bags 320 is closed. Once communication between the interiors 342 of opposite air bags 320 is closed, by virtue of a corresponding air passage 340 being out of register with conduit 354, the deflated, collapsed one of the opposite air bags 340 will remain collapsed and the inflated, expanded one of the opposite air bags 340 will remain expanded as the rotary member 310 rotates through a cycle of operation.

A drive assembly 360 includes a driver juxtaposed with the upper location 330, the driver being shown in FIGS. 3 and 5 in the form of a lobe 362 carried by a lobed wheel 364 mounted for rotation in synchronism with the rotation of rotary member 310, immediately above the air bag 320U. Air bag 320U, previously in the form of an air bag 320 having an expanded configuration, filled with a gas, preferably air, prior to reaching upper location 330, is moved by buoyant forces to the upper location 330 where air bag 320 is engaged by lobe 362 and is deflated and collapsed, into a collapsed configuration, as shown, thereby expressing air from the interior 342U of air bag 320U and passing the expressed air into the interior 342L of air bag 320L, via interconnecting passage 340 and conduit 354. As a result, air bag 320L is filled with air, expanding air bag 320L from a collapsed configuration into an inflated, expanded configuration. Thus expanded, inflated air bag 320 is raised by buoyant forces toward the upper location 330, thereby rotating the rotary member 310 and moving the collapsed, deflated air bag 320U to the lower location 332.

Each inflated air bag 320, in turn, reaches the upper location 330 and is engaged by a lobe 362, to be deflated and collapsed, and moved in the collapsed configuration to the lower location 332 to be re-inflated and moved once-again to the upper location 330, again by buoyant forces. A power generator in the form of generator 370 is coupled to rotary member 310, through axle 312, and generates power in response to rotation of the rotary member 310. In the preferred construction, lobed wheel 364 is provided with multiple lobes 362 to facilitate the engagement of each air bag 320 with a lobe 362. Each air bag 320 has a prescribed inflated configuration, here shown as being generally cylindrical, and preferably is fitted within a recess 380 having a configuration complementary to the prescribed inflated configuration of the air bags 320. Each lobe 362 is provided with a configuration along an air bag engaging surface 382 complementary to the configuration of each recess 380 to attain a substantially fully collapsed configuration of each air bag 320 for an effective deflation of each air bag 320U and inflation of counterpart air bag 320L. In the preferred construction, rotation of lobed wheel 364 is effected, in the counterclockwise direction indicated by arrow 386, by a drive motor 390 coupled to lobed wheel 364 and preferably powered by a solar panel 392, through a motor controller 394, as shown in FIGS. 3 and 5.

It is to be understood that the above detailed description of preferred embodiments of the invention is provided by way of example only. Various details of design, construction and procedure may be modified without departing from the true spirit and scope of the appended claims.

The embodiments of the invention in which an exclusive property or privilege is claimed are defined as follows:

1. A method for utilizing buoyancy forces to generate power, the method comprising:
   mounting a rotary member for rotation about an axis of rotation while immersed in a liquid, the rotary member having a perimeter spaced from the axis of rotation;
   placing a plurality of collapsible gas bags spaced circumferentially from one-another along the perimeter of the rotary member;
   orienting the axis of rotation of the rotary member in a horizontal orientation such that rotation of the rotary member about the axis of rotation will move the gas bags between an uppermost elevation and a lowermost elevation;
   locating each gas bag relative to a counterpart gas bag such that upon a gas bag reaching an upper location adjacent the uppermost elevation, a corresponding counterpart gas bag is placed at a lower location adjacent the lowermost elevation;
   providing a plurality of gas passages, with each gas passage establishing communication between a gas bag and a corresponding counterpart gas bag;
   arranging the gas bags such that upon inflating a gas bag with gas into an expanded configuration, the corresponding counterpart gas bag is in a collapsed configuration, substantially devoid of gas;
   operating a valving system communicating with each gas passage to open communication between a gas bag placed at the upper location and the corresponding counterpart gas bag placed at the lower location, while closing communication between each gas bag and a corresponding gas bag not placed at respective upper and lower locations such that upon an expanded, inflated gas bag reaching the upper location, a corresponding counterpart gas bag, collapsed and deflated, is placed at the lower location;
   collapsing the gas bag placed at the upper location to express gas from within the gas bag placed at the upper location and pass the expressed gas through a corresponding gas passage into the corresponding counterpart gas bag placed at the lower location so as to deflate the gas bag placed at the upper location and inflate and expand the corresponding counterpart gas bag placed at the lower location, whereby buoyant forces raise the expanded, inflated counterpart gas bag from the lower location to the upper location, thereby rotating the rotary member and moving the collapsed, deflated gas bag from the upper location to the lower location; and
   coupling a power generator with the rotary member to generate power in response to rotation of the rotary member.

2. The method of claim 1 wherein the gas is air.

3. The method of claim 1 wherein the liquid is water.

4. The method of claim 1 wherein the liquid is water and the gas is air.

5. The method of claim 1 including spacing the perimeter radially from the axis of rotation, and placing each counterpart gas bag diametrically opposite a corresponding air bag.

6. The method of claim 5 including placing the upper location at the uppermost elevation and placing the lower location at the lowermost elevation.

7. The method of claim 1 including placing the upper location at the uppermost elevation and placing the lower location at the lowermost elevation.

8. An apparatus for utilizing buoyancy forces to generate power, the apparatus comprising:
   a rotary member mounted upon an axle for rotation about an axis of rotation while immersed in a liquid, the rotary member having a perimeter spaced from the axis of rotation;
   a plurality of collapsible gas bags spaced circumferentially from one-another along the perimeter of the rotary member, the axle of the rotary member being in a horizontal orientation such that rotation of the rotary member about the axis of rotation will move the gas bags between an uppermost elevation and a lowermost elevation, each gas bag being located relative to a counterpart gas bag such that upon a gas bag reaching an upper location adjacent the uppermost elevation, a corresponding counterpart gas bag will be placed at a lower location adjacent the lowermost elevation;
   a plurality of gas passages, each gas passage providing communication between a gas bag and a corresponding counterpart gas bag, the gas bags being charged with a gas and arranged such that upon a gas bag being in an expanded configuration, inflated with the gas, the corresponding counterpart gas bag will be in a collapsed configuration, deflated from the gas;
   a valving system communicating with each gas passage and arranged to open communication between a gas bag placed at the upper location and the corresponding counterpart gas bag placed at the lower location, while closing communication between each gas bag and a corresponding gas bag not placed at respective upper and lower locations such that upon an expanded, inflated gas bag reaching the upper location, a corresponding counterpart gas bag, collapsed and deflated, will be placed at the lower location;
   a drive assembly including a driver juxtaposed with the upper location and movable to collapse the gas bag placed at the upper location such that gas is expressed from within the gas bag placed at the upper location and is passed through a corresponding gas passage into the corresponding counterpart gas bag placed at the lower location so as to inflate and expand the corresponding counterpart gas bag, whereby buoyant forces will raise the expanded, inflated counterpart gas bag from the lower location to the upper location, thereby rotating the rotary member and moving the collapsed, deflated gas bag from the upper location to the lower location; and
   a power generator coupled with the rotary member for generating power in response to rotation of the rotary member.

9. The apparatus of claim 8 wherein the gas is air.

10. The apparatus of claim 8 wherein the liquid is water.

11. The apparatus of claim 8 wherein the liquid is water and the gas is air.

12. The apparatus of claim 8 wherein the perimeter is spaced radially from the axis of rotation, and each counterpart gas bag is placed diametrically opposite a corresponding air bag.

13. The apparatus of claim 12 wherein the upper location is placed at the uppermost elevation and the lower location is placed at the lowermost elevation.

14. The apparatus of claim 8 wherein the upper location is placed at the uppermost elevation and the lower location is placed at the lowermost elevation.

15. The apparatus of claim 8 wherein the driver comprises a lobed wheel mounted for rotation in synchronism with the rotary member and including at least one lobe for engaging each gas bag upon location of the gas bag at the upper location.

16. The apparatus of claim 15 wherein:
   the rotary member includes a plurality of recesses spaced from one-another circumferentially along the perimeter of the rotary member, each recess having a given configuration; and
   the lobe has a configuration complementary to the given configuration of each recess;
   whereby upon reaching the upper location, each gas bag is juxtaposed with a corresponding recess and upon engagement of the lobe with a gas bag at the upper location, the engaged gas bag will be substantially fully collapsed and gas will be passed from the gas bag placed at the upper location into the corresponding counterpart gas bag placed at the lower location to inflate and expand the corresponding counterpart gas bag and enable the expanded, inflated counterpart air bag to rise to the upper location while the collapsed, deflated air bag proceeds to the lower location.

17. The apparatus of claim 16 wherein each gas bag has an external configuration complementary to the given configuration of each recess.

18. The apparatus of claim 17 wherein the drive assembly includes a drive motor coupled to the lobed wheel for rotating the lobed wheel.

19. The apparatus of claim 18 including a solar panel for providing motive power to the drive motor.

\* \* \* \* \*